United States Patent
Seo et al.

(10) Patent No.: US 12,202,008 B2
(45) Date of Patent: *Jan. 21, 2025

(54) LOW-GLOSS CURED PRODUCT HAVING EXCELLENT STAIN RESISTANCE, AND MANUFACTURING METHOD THEREFOR

(71) Applicant: LG HAUSYS, LTD., Seoul (KR)

(72) Inventors: Ji Yeon Seo, Seoul (KR); Heon Jo Kim, Seoul (KR); Min Kyung Park, Seoul (KR); Tae Yi Choi, Seoul (KR)

(73) Assignee: LG Hausys, Ltd., Seoul (KR)

( * ) Notice: Subject to any disclaimer, the term of this patent is extended or adjusted under 35 U.S.C. 154(b) by 33 days.

This patent is subject to a terminal disclaimer.

(21) Appl. No.: 17/867,380

(22) Filed: Jul. 18, 2022

(65) Prior Publication Data

US 2022/0347718 A1    Nov. 3, 2022

Related U.S. Application Data

(62) Division of application No. 16/498,518, filed as application No. PCT/KR2018/009554 on Aug. 21, 2018, now abandoned.

(30) Foreign Application Priority Data

Aug. 28, 2017 (KR) .................. 10-2017-0108613

(51) Int. Cl.
*B05D 3/02* (2006.01)
*B05D 3/10* (2006.01)
(Continued)

(52) U.S. Cl.
CPC ............ *B05D 3/02* (2013.01); *B05D 3/10* (2013.01); *C09D 5/28* (2013.01); *C09D 7/61* (2018.01); *C09D 133/06* (2013.01)

(58) Field of Classification Search
CPC ..... B05D 3/02; B05D 3/10; C09D 7/61; C09D 5/28; C09D 133/06
See application file for complete search history.

(56) References Cited

U.S. PATENT DOCUMENTS

| 2001/0038910 A1* | 11/2001 | MacQueen | ............. C09D 7/67 428/327 |
| 2013/0224495 A1* | 8/2013 | Gan | ...................... C04B 41/009 428/413 |

(Continued)

FOREIGN PATENT DOCUMENTS

| CN | 102321399 A | 1/2012 |
| CN | 103073934 A | 5/2013 |

(Continued)

OTHER PUBLICATIONS

Schubert et al. "VUV-induced micro-folding of acrylate-based coatings: 2. Characterization of surface properties" Surface and Coatings Technology vol. 203, Issue 24, 2009, pp. 3734-3740.*

(Continued)

*Primary Examiner* — Robert S Walters, Jr.
(74) *Attorney, Agent, or Firm* — Bryan Cave Leighton Paisner LLP

(57) ABSTRACT

The present invention relates to a cured product having excellent stain resistance and low gloss, a method of manufacturing the same, and an interior material including the cured product. The cured product according to the present invention includes, along with an acrylic oligomer, an oligomer having a functional group containing silicon (Si) and an oligomer having a functional group containing fluorine (F), and thus, has excellent stain resistance and can implement a micro-folded structure on a surface thereof through extreme ultraviolet rays to be used during curing, thereby being capable of realizing low gloss without a matting agent.

5 Claims, 2 Drawing Sheets

(51) Int. Cl.
   *C09D 5/28*      (2006.01)
   *C09D 7/61*      (2018.01)
   *C09D 133/06*    (2006.01)

(56) References Cited

U.S. PATENT DOCUMENTS

| | | | | |
|---|---|---|---|---|
| 2014/0247486 | A1* | 9/2014 | Shibata | G02B 1/11 |
| | | | | 359/488.01 |
| 2015/0240108 | A1* | 8/2015 | Tian | C09D 175/14 |
| | | | | 428/335 |

FOREIGN PATENT DOCUMENTS

| | | | |
|---|---|---|---|
| CN | 103555156 A | * | 2/2014 |
| CN | 103073934 B | | 7/2015 |
| JP | 2002-194249 A | | 7/2002 |
| JP | 2005-22354 A | | 1/2005 |
| JP | 5353605 B2 | | 11/2013 |
| JP | 2015-010426 A | | 1/2015 |
| JP | 2015-180717 A | | 10/2015 |
| KR | 10-2004-0087239 A | | 10/2004 |
| KR | 10-2016-0060876 A | | 5/2016 |
| WO | 2011/084554 A1 | | 7/2011 |
| WO | 2016/160673 A1 | | 10/2016 |

OTHER PUBLICATIONS

Mulholland, "Introduction to Color Theory," ANTEC 1997 Plastics: Plastics Saving Planet Earth, vol. 3: Special Areas, Plastic Engineers, pp. 1-6. (Year: 1997).*
CN 103555165 A, machine translation, EPO espacenet. (Year: 2014).*

* cited by examiner

[FIG 1]
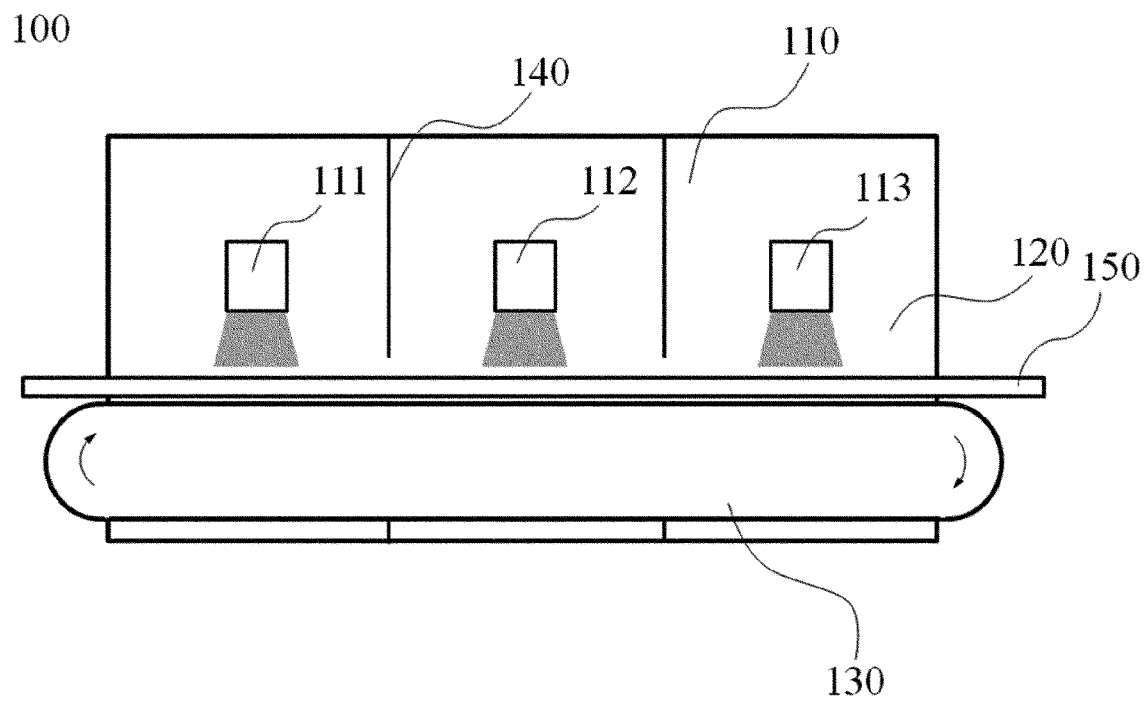

[FIG 2]
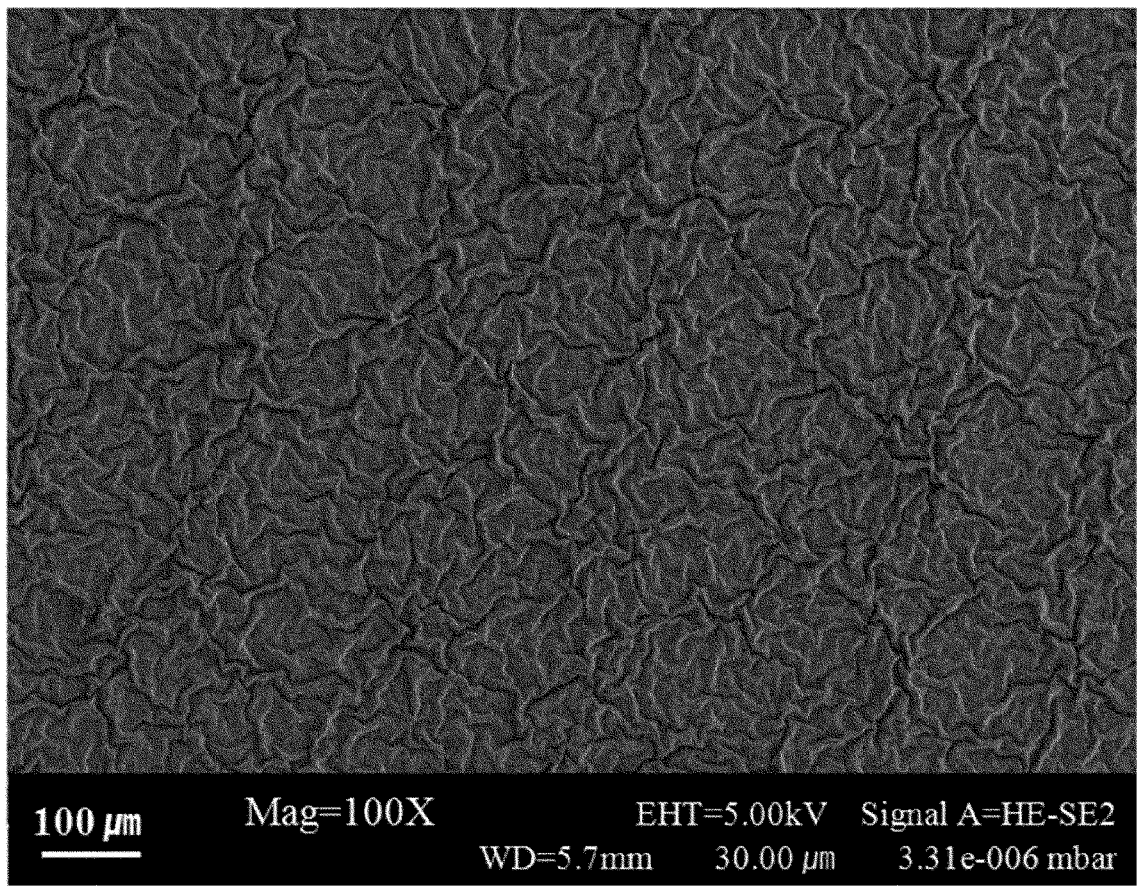

LOW-GLOSS CURED PRODUCT HAVING EXCELLENT STAIN RESISTANCE, AND MANUFACTURING METHOD THEREFOR

This application is a Divisional Application of U.S. patent application Ser. No. 16/498,518, filed on Sep. 27, 2019, which is a National Stage Entry of International Application No. PCT/KR2018/009554, filed Aug. 21, 2018, and claims the benefit of Korean Application No. 10-2017-0108613, filed on Aug. 28, 2017, all of which are hereby incorporated by reference in their entirety for all purposes as if fully set forth herein.

TECHNICAL FIELD

The present invention relates to a cured product having excellent stain resistance and low gloss, a method of manufacturing the same, and an interior material including the cured product, and more particularly, to a cured product having excellent stain resistance due to the inclusion of a predetermined amount of an oligomer having a functional group containing silicon (Si) and/or fluorine (F), and having a folded structure on a surface thereof through irradiation of a resin composition with extreme ultraviolet rays during a manufacturing process and thus exhibiting low gloss without use of a matting agent; and an interior material including the cured product.

BACKGROUND ART

In general, residential flooring, which is generally used to finish floors of living rooms and rooms of detached houses or apartments, provides a hygienic space by blocking dust and chilly air from a cement floor. Such residential flooring is printed with various beautiful patterns, thereby providing decorative effects such as changing an indoor atmosphere to make it cozy according to customer demand. When a surface of such existing flooring is contaminated with contaminants, a user cannot easily remove traces of the contaminants. Such flooring with traces of contaminants cannot fulfill basic functions thereof.

To address such a problem, a surface treatment layer is formed on an uppermost layer of a flooring material, whereby stain resistance, as well as abrasion resistance and scratch resistance, are imparted to the flooring material. However, in the case of conventional flooring, stain resistance is decreased as gloss decreases, whereby difficulty in cleaning greatly increases. Accordingly, it is difficult to impart natural gloss, as in a natural material, while maintaining high stain resistance. In particular, when conventional flooring materials, to which stain resistance is imparted, are contaminated by oil-based magic-marker marks and other pollutants, the contaminants are erased from a flooring material having a gloss of 10 or higher, but are not erased from a flooring material having a gloss of 8 or less, based on a 60 degree gloss meter. In addition, stain resistance is rapidly decreased due to abrasion of silicon included in an ultraviolet-cured surface treatment composition for treating surfaces of the flooring materials. In addition, a conventional ultraviolet-cured surface treatment composition includes a considerable amount of micrometer (μm)-sized silica as a matting agent so as to lower the gloss of a flooring material treated therewith. Since such silica is porous and has a very low apparent specific gravity, fine dust, moisture, oil, and the like are easily adsorbed and stain resistance is rapidly decreased, as a use amount of the silica increases. In addition, traces such as fingerprints, footprints, and sweat stains remain on a surface of a floor material surface-treated with the matting agent, and the appearance of the floor material becomes cloudy like fog.

Accordingly, there is an urgent need for development of a material having improved stain resistance to the extent of preventing easy contamination by oil stains, food stains, pencil marks, dust, and ingrained stains at home, while realizing the gloss of a flooring material in a low state without a matting agent such as micrometer (μm)-sized silica.

DISCLOSURE

Technical Problem

The present invention is directed to providing a cured product exhibiting excellent stain resistance while realizing surface gloss in a low state without use of a matting agent, and an interior material using the cured product.

Technical Solution

One aspect of the present invention provides a cured product, including:
a resin composition including an oligomer including a silicon (Si)-containing functional group; an oligomer including a fluorine (F)-containing functional group; an acrylic oligomer; a monomer; and an initiator,
wherein a surface of the cured product has a micro-folded structure, and
a surface gloss of the cured product is 9 or less under a 60° gloss condition.

Another aspect of the present invention provides a method of manufacturing a cured product, the method including:
a first light irradiation step of irradiating a resin composition including an oligomer including a silicon (Si)-containing functional group; an oligomer including a fluorine (F)-containing functional group; and an acrylic oligomer with light having a wavelength of 300 nm or less to activate a resin composition;
a second light irradiation step of irradiating the activated resin composition with light having a wavelength of 700 nm or higher to thermally cure the resin composition; and
a third light irradiation step of irradiating the thermally cured resin composition with light having a wavelength of 400 nm or less to optically cure the resin composition.

Still another aspect of the present invention provides an interior material including a substrate and the cured product formed on the substrate.

Advantageous Effects

A cured product according to the present invention includes, along with an acrylic oligomer, an oligomer having a functional group containing silicon (Si) and an oligomer having a functional group containing fluorine (F), and thus, the cured product has excellent stain resistance and a micro-folded structure can be realized on a surface of the cured product through extreme ultraviolet rays to be used during curing, whereby low gloss can be realized without a matting agent.

DESCRIPTION OF DRAWINGS

FIG. 1 is a structural diagram briefly illustrating the structure of a light-curing apparatus used in the present invention.

FIG. 2 is an electron microscope image illustrating a micro-folded shape of a surface of a cured product according to the present invention.

BEST MODE FOR CARRYING OUT THE INVENTION

As the invention allows for various changes and numerous embodiments, particular embodiments are illustrated in the drawings and described in detail in the written description.

However, this is not intended to limit the present invention to particular modes of practice, and it is to be appreciated that all changes, equivalents, and substitutes that do not depart from the spirit and technical scope of the present invention are encompassed in the present invention.

In the present invention, the terms such as "include" or "comprise" should be construed to denote a certain characteristic, number, step, operation, constituent element, or a combination thereof, but should not be construed to exclude the existence of or a possibility of addition of one or more other characteristics, numbers, steps, operations, constituent elements, or combinations thereof.

The present invention relates to an extreme ultraviolet-cured product and an interior material including the same.

When a surface of existing flooring is contaminated with contaminants, a user cannot easily remove traces of the contaminants. Such flooring with traces of contaminants cannot fulfill basic functions thereof. To address such a problem, a surface treatment layer is formed on an uppermost layer of a flooring material, whereby stain resistance, as well as abrasion resistance and scratch resistance, are imparted to the flooring material.

However, in the case of conventional flooring, stain resistance is decreased as gloss is low, whereby difficulty in cleaning greatly increases. Accordingly, it is difficult to impart natural gloss, as in a natural material, while maintaining high stain resistance. In particular, when conventional flooring materials, to which stain resistance is imparted, are contaminated by oil-based magic-marker marks and other pollutants, the contaminants are erased from a flooring material having a gloss of 10 or higher, but are not erased from a flooring material having a gloss of 8 or less, based on a 60 degree gloss meter. In addition, stain resistance is rapidly decreased due to abrasion of silicon included in an ultraviolet-cured surface treatment composition for treating surfaces of the flooring materials. In addition, a conventional ultraviolet-cured surface treatment composition includes a considerable amount of micrometer (μm)-sized silica as a matting agent so as to lower the gloss of a flooring material treated therewith. Since such silica is porous and has a very low apparent specific gravity, fine dust, moisture, oil, and the like are easily adsorbed and stain resistance is rapidly decreased, as the content of the silica increases. In addition, traces such as fingerprints, footprints, and sweat stains remain on a surface of a floor material surface-treated with the matting agent, and the appearance of the floor material becomes cloudy like fog.

Accordingly, the present invention provides a cured product having excellent stain resistance and low gloss.

A cured product according to the present invention includes, along with an acrylic oligomer, an oligomer having a functional group containing silicon (Si) and an oligomer having a functional group containing fluorine (F), and thus, the cured product has excellent stain resistance and a micro-folded structure can be realized on a surface of the cured product through extreme ultraviolet rays to be used during curing, whereby low gloss can be realized without a matting agent.

Hereinafter, the present invention is described in more detail.

Cured Product

An embodiment of the present invention provides
a cured product of a resin composition including an oligomer including a silicon (Si)-containing functional group; an oligomer including a fluorine (F)-containing functional group; and an acrylic oligomer,
wherein a surface of the cured product has a micro-folded structure, and
the cured product has a surface gloss of 9 or less under a 60° gloss condition.

The cured product according to the present invention is manufactured by curing a resin composition, has excellent stain resistance, and has low gloss, without the inclusion of a matting agent, due to a micro-folded structure formed on a surface thereof. In particular, the cured product may be cured by irradiating a resin composition with extreme ultraviolet rays of less than 300 nm, thereby realizing a micro-folded structure on a surface thereof. The formed micro-folded structure may induce scattering of light incident on a surface of the cured product, thereby reducing gloss.

As one example, a reduced surface gloss of the cured product according to the present invention may be 9 or less under a 60° gloss condition using a gloss meter. In particular, an upper limit of the reduced surface gloss may be 8 or less, 7.5 or less, 7 or less, 6.5 or less, 6 or less, or 5 or less, and a lower limit thereof may be 0.1 or more, 0.5 or more, 1 or more, 1.5 or more, 2 or more, 2.5 or more, or 3 or more. For example, a surface gloss of the cured product may be 1 to 8, 1 to 7, 1 to 6, 4 to 8, 4 to 7, 7 to 9, 7.2 to 8.7, 4 to 6, 2 to 5, 2.5 to 3.5, 4.5 to 5.5, 2.8 to 5.2, or 3.2 to 4.7.

In addition, the resin composition used to manufacture the cured product includes an oligomer including a silicon (Si)-containing functional group and an oligomer including a fluorine (F)-containing functional group, thereby having excellent stain resistance. In particular, the oligomer including a silicon (Si)-containing functional group and/or a fluorine (F)-containing functional group included in the resin composition serves to increase surface tension of the resin composition. The surface tension-increased resin composition may form a cured product having low surface energy upon curing. Accordingly, the cured product having low surface energy has excellent stain resistance, whereby adsorption of fine dust, moisture, oil, and the like thereto is prevented.

For example, since a surface of the cured product according to the present invention has improved stain resistance, a surface area of the cured product surface contaminated by oily magic-marker marks may be 5% or less, particularly 4% or less, 3% or less, 2% or less, based on an initial contamination area, when removed with dry cotton fiber, generally used at home, 30 seconds after the contamination. In some cases, the oily magic marker ingredient on the surface may be completely removed to the extent of not being visually observed.

Here, the oligomer including a silicon (Si)-containing functional group and/or a fluorine (F)-containing functional group included in the resin composition may be a silicon-modified acrylic resin or a fluorine-containing acrylic resin. For example, the silicon-modified acrylic resin may be an oligomer prepared by polymerizing an acrylic monomer, such as alkylacrylate or alkyl(meth)acrylate, with an alkoxysilane-based acrylic monomer such as 3-methacryloxypropyltrimethoxysilane (MPTS) having a silicon (Si)-containing functional group, or a silicon urethane acrylate polymer or silicon polyester acrylate polymer prepared by modifying a urethane acrylate polymer or polyester acrylate with silicon (Si). In addition, the fluorine-containing acrylic resin may be obtained by polymerizing fluorine-containing alkyl acrylate or fluorine-containing alkyl(meth)acrylate, but the present invention is not limited thereto.

In addition, the resin composition includes an oligomer including a silicon (Si)-containing functional group and/or a fluorine (F)-containing functional group, and an acrylic oligomer and monomer used as bases.

In particular, the resin composition may include 100 parts by weight of an acrylic oligomer; 10 to 40 parts by weight of an oligomer including a silicon (Si)-containing functional group; 5 to 15 parts by weight of an oligomer including a fluorine (F)-containing functional group; and 40 to 150 parts by weight of a monomer.

As one example, the resin composition may include, based on 100 parts by weight of the acrylic oligomer, 15 to 40 parts by weight, 15 to 30 parts by weight, 18 to 35 parts by weight, 18 to 25 parts by weight, 20 to 30 parts by weight, 20 to 40 parts by weight, 25 to 40 parts by weight, 25 to 30 parts by weight, 18 to 22 parts by weight, or 22 to 27 parts by weight of the oligomer including a silicon (Si)-containing functional group; 5 to 13 parts by weight, 8 to 13 parts by weight, 5 to 10 parts by weight, 8 to 10 parts by weight, 10 to 15 parts by weight, 12 to 15 parts by weight, or 11 to 13 parts by weight of the oligomer including a fluorine (F)-containing functional group; and 30 to 130 parts by weight, 30 to 110 parts by weight, 30 to 90 parts by weight, 30 to 70 parts by weight, 30 to 60 parts by weight, 50 to 150 parts by weight, 70 to 150 parts by weight, 90 to 150 parts by weight, 110 to 150 parts by weight, 130 to 150 parts by weight, 80 to 130 parts by weight, 90 to 125 parts by weight, 110 to 125 parts by weight, 118 to 122 parts by weight, 50 to 90 parts by weight, 50 to 75 parts by weight, 50 to 65 parts by weight, 55 to 65 parts by weight, 57 to 62 parts by weight, 48 to 52 parts by weight, 45 to 55 parts by weight, 55 to 65 parts by weight, 115 to 125 parts by weight, or 35 to 55 parts by weight of the monomer.

As one example, the resin composition may include 100 parts by weight of the acrylic oligomer; 23 to 28 parts by weight of the oligomer including a silicon (Si)-containing functional group; 9 to 12 parts by weight of the oligomer including a fluorine (F)-containing functional group; and 48 to 52 parts by weight of the monomer.

In addition, the acrylic oligomer is not specifically limited so long as it is obtained using a monomer including an acryl group. For example, the acrylic oligomer may include a (meth)acrylate oligomer, a urethane (meth)acrylate oligomer, etc.

In addition, the acrylic oligomer may have a weight average molecular weight (Mw) of 100 to 20,000, more particularly a weight average molecular weight (Mw) of 100 to 10,000, 100 to 5,000, 500 to 3,000, 500 to 2,500, 500 to 2000, 900 to 1,100, 1,000 to 3,000, 1,000 to 2,500, 2,200 to 2,600, 4,000 to 7,000, 1,000 to 15,000, 1,000 to 11,500, 5,000 to 15,000, 8,000 to 13,000, 10,000 to 12,000, or 10,000 to 10,000. In the present invention, a weight average molecular weight (Mw) of the acrylic oligomer is adjusted within the ranges, whereby durability of the cured product is further improved.

In addition, the monomer may be an acrylic monomer, particularly an acrylate-based monomer containing a hydrophilic group, but the present invention is not limited thereto. For example, as the monomer, one or more selected from the group consisting of (meth)acrylate, 2-hydroxyethyl (meth)acrylate, 2-hydroxypropyl (meth)acrylate, 4-hydroxybutyl (meth)acrylate, 6-hydroxyhexyl(meth)acrylate, 8-hydroxyoctyl(meth)acrylate, 2-hydroxyethylene glycol (meth)acrylate or 2-hydroxypropylene glycol (meth)acrylate, acrylic acid, methacrylic acid, 2-(meth)acryloyloxyacetic acid, 3-(meth)acryloyloxypropyl acid, 4-(meth)acryloyloxybutyl acid, 1,6-hexanediol diacrylate, an acrylic acid duplex, itaconic acid, maleic acid, caprolactone-modified hydroxyl acrylate (CHA), tetraethylene glycol diacrylate, tripropylene glycol diacrylate, dipropylene glycol diacrylate, triethylene glycol diacrylate, pentaerythritol triacrylate, and trimethylolpropane ethoxy triacrylate may be included.

Further, the resin composition may further include additives such as a dispersing agent, a leveling agent, a defoaming agent, an antifoaming agent, a precipitation inhibitor, and a wetting agent. As one example, to improve abrasion resistance of the cured product, inorganic particles having high hardness may be further included. Such inorganic particles are not specifically limited so long as surface hardness can be increased without affecting the gloss of a cured product after curing of a resin composition. Particularly, colloidal silica, alumina, glass beads, organic beads (polymer particles, etc.), etc., preferably colloidal silica, may be used.

In addition, the inorganic particles may have an average diameter of 1 nm to 100 nm, particularly an average diameter of 10 nm to 100 nm, 10 nm to 80 nm, 10 nm to 60 nm, 10 nm to 40 nm, 10 nm to 30 nm, or 15 nm to 25 nm. In addition, the content of the inorganic particles may be 1 part by weight to 40 parts by weight, particularly 5 to 35 parts by weight, 5 parts by weight to 30 parts by weight, 5 parts by weight to 25 parts by weight, 10 parts by weight to 25 parts by weight, 10 parts by weight to 30 parts by weight, 15 to 25 parts by weight, or 18 to 22 parts by weight, based on 100 parts by weight of the total resin composition. When the average diameter and content of the inorganic particles of the present invention are controlled within the ranges, crack occurrence in the cured product may be prevented without affecting the gloss of the cured product, the adhesive strength between the cured product and other layers may be increased, thereby increasing durability, and abrasion resistance of the cured product may be effectively improved.

As one example, when the cured product according to the present invention is subjected to an abrasion resistance test 500 times under conditions of an H-18 abradant and a load of 500 g, a weight change in the worn specimen (width× length: 10 cm×10 cm, an average thickness of the cured product: 18±2 μm) may be 400 mg or less, particularly 300 to 400 mg, 350 to 400 mg, 370 to 400 mg, 380 to 390 mg, or 383 to 387 mg.

Method of Manufacturing Cured Product

In addition, an embodiment of the present invention provides a method of manufacturing a cured product, the method including:

a first light irradiation step of irradiating a resin composition including an oligomer including a silicon (Si)-containing functional group; an oligomer including a fluorine (F)-containing functional group; and an acrylic oligomer with light having a wavelength of 300 nm or less to activate a resin composition;

a second light irradiation step of irradiating the activated resin composition with light having a wavelength of 700 nm or higher to thermally cure the resin composition; and a third light irradiation step of irradiating the thermally cured resin composition with light having a wavelength of 400 nm or less to optically cure the resin composition.

The present invention includes the steps of sequentially irradiating the resin composition including an oligomer including a silicon (Si)-containing functional group; an oligomer including a fluorine (F)-containing functional group; and an acrylic oligomer with light in specific different wavelength ranges three times to cure the resin composition, so that a micro-folded structure may be realized on a surface of the produced cured product.

Here, the first light irradiation step is a first step of irradiating a resin composition applied on a substrate with light. In the first light irradiation step, an excimer generated by irradiated light forms wrinkles by shrinking the applied resin composition and/or a surface of the cured product, thereby increasing a scattering rate of light incident on the surface. The present invention includes the first light irradiation step of forming an excimer, thereby being capable of shrinking the resin composition and/or a surface of the cured product and increasing a scattering rate of light. Accordingly, the present invention may lower a gloss degree of the cured product without use of a matting agent. For this, the first light irradiation step may be performed using high-energy light in a wavelength region of 300 nm or less, particularly 200 nm or less, more particularly 100 to 200 nm, 150 to 190 nm or 160 to 180 nm, in a nitrogen ($N_2$) atmosphere including a small amount of oxygen ($O_2$). Here, the concentration of oxygen ($O_2$) included in a nitrogen ($N_2$) atmosphere may be 10 to 10,000 ppm, particularly 10 to 9,000 ppm, 10 to 7,000 ppm, 10 to 5,000 ppm, 10 to 3,000 ppm, 10 to 1,000 ppm, 10 to 500 ppm, 100 to 300 ppm, 10 to 200 ppm, 5,000 to 9,000 ppm, 4,000 to 6,000 ppm, 1,000 to 5,000 ppm, 1,000 to 2,000 ppm, 2,000 to 3,000 ppm, 3,000 to 4,000 ppm, 4,000 to 5,000 ppm, 10 to 2,000 ppm, 50 to 500 ppm, 50 to 300 ppm, 50 to 150 ppm, or 80 to 120 ppm.

As one example, in the first light irradiation step, the resin composition may be irradiated with light having a wavelength of 175±2 nm for a very short time of 1 to 2 seconds under a nitrogen ($N_2$) condition containing 100±10 ppm of oxygen ($O_2$) so as to form an excimer in the resin composition.

In addition, the resin composition may be applied to the substrate by a method known in the technical field to which the present invention pertains. For example, methods such as rubber rolling, G/V rolling, an air knife method, and a slot die method may be used.

In addition, the second light irradiation step is a step of applying thermal energy to the surface-shrunk resin composition and/or cured product to activate the same. Here, the thermal energy may be applied by irradiating a wavelength of 700 nm or more, particularly a wavelength of 700 nm to 900 nm, 750 nm to 900 nm, or 750 nm to 850 nm, under an air condition. The temperature of a thermal energy-applied resin composition and/or cured product surface may be 20° C. to 90° C., particularly 30° C. to 80° C.

As one example, the second light irradiation step may be performed by irradiating the resin composition and/or the cured product with light having a wavelength of 800±2 nm for a very short time of 1 to 2 seconds under an air condition.

In addition, the third light irradiation step is a step of primarily applying light energy to the thermally cured resin composition and/or a cured product to cure the same. Here, the light energy may be applied using light having a wavelength of 400 nm or less, particularly a wavelength of 100 nm to 400 nm, 200 nm to 400 nm, 200 nm to 300 nm, 300 nm to 400 nm, 150 nm to 300 nm, 200 nm to 250 nm, or 270 nm to 320 nm, in a nitrogen ($N_2$) atmosphere including a small amount of oxygen ($O_2$). Here, the concentration of oxygen ($O_2$) included in the nitrogen ($N_2$) atmosphere may be 10 to 10,000 ppm, particularly 10 to 9,000 ppm, 10 to 7,000 ppm, 10 to 5,000 ppm, 10 to 3,000 ppm, 10 to 1,000 ppm, 10 to 500 ppm, 100 to 300 ppm, 10 to 200 ppm, 5,000 to 9,000 ppm, 4,000 to 6,000 ppm, 1,000 to 5,000 ppm, 1,000 to 2,000 ppm, 2,000 to 3,000 ppm, 3,000 to 4,000 ppm, 4,000 to 5,000 ppm, 10 to 2,000 ppm, 50 to 500 ppm, 50 to 300 ppm, 50 to 150 ppm, or 80 to 120 ppm.

Further, the method of manufacturing the cured product according to the present invention may further include, after the third light irradiation step, a fourth light irradiation step of irradiating the optically cured resin composition with light having a wavelength of 700 nm or higher to thermally cure the resin composition. The fourth light irradiation step is a step of additionally performing thermal curing of the resin composition. Here, the thermal energy may be applied by irradiating light having a wavelength of 700 nm or more, particularly a wavelength of 700 nm to 900 nm, 750 nm to 900 nm, or 750 nm to 850 nm, under an air condition. The temperature of the thermal energy-applied resin composition and/or cured product surface may be 20 to 90° C., particularly 30° C. to 80° C.

As one example, the fourth light irradiation step may be performed by irradiating the resin composition and/or the cured product with light having a wavelength of 800±2 nm for a very short time of 1 to 2 seconds under an air condition.

In the present invention, light having a wavelength required in each step may be irradiated according to known methods. For example, light having a wavelength of 400 nm or less, which is in a UV region, may be irradiated using a mercury or metal halide lamp, or the like. Here, a light irradiation amount may be 500 mJ/cm$^2$ to 1,300 mJ/cm$^2$, or 700 mJ/cm$^2$ to 1,100 mJ/cm$^2$.

In addition, in the present invention, a light irradiation time may be a very short time of 1 to 2 seconds. Such a light irradiation time may be controlled according to a migration rate of a resin composition, e.g., a migration rate of a resin composition coated on a substrate, during light irradiation. For example, a migration rate of the resin composition and/or the substrate coated with the resin composition may be 1 to 50 m/min, particularly 5 to 40 m/min, 10 to 40 m/min, 20 to 40 m/min, 30 to 40 m/min, 15 to 25 m/min, 5 to 15 m/min, 15 to 20 m/min, 35 to 40 m/min, or 18 to 22 m/min.

Meanwhile, the resin composition used in the present invention excludes a matting agent for reducing the gloss of a cured product, unlike existing resin compositions. Accordingly, the resin composition may have a viscosity of 100 cps to 1,000 cps, particularly 800 cps or less, at 25° C. More particularly, the resin composition may have a low viscosity of 600 cps or less, 100 to 500 cps, 100 to 450 cps, 150 to 350 cps, 200 to 350 cps, 250 to 350 cps, 280 to 300 cps, 400 to 500 cps, or 440 to 460 cps. Even when inorganic particles are further included to increase the durability of the cured product, a low viscosity of 500 to 750 cps may be exhibited. The resin composition has an advantage of excellent workability by having such a low viscosity.

Interior Material

Further, an embodiment of the present invention provides an interior material including the cured product according to the present invention.

The interior material according to the present invention includes the aforementioned cured product according to the present invention, thereby simultaneously realizing low gloss and high stain resistance and abrasion resistance. Accordingly, the interior material may be usefully used for flooring requiring low gloss and high durability, and the like.

Here, the interior material may include the cured product according to the present invention as a surface treatment layer formed on a substrate thereof. As needed, so as to add functions to the interior material, functional layers such as a printed layer, a balance layer, and a dimensionally stable layer may be further included between the substrate and the cured product as a surface treatment layer. As one example, the interior material may have a structure wherein a balance layer, a substrate layer, a printed layer, a transparent layer, and a surface treatment layer are sequentially laminated, or a structure wherein a substrate layer, a printed layer, a transparent layer, and a surface treatment layer are sequentially laminated.

Here, the transparent layer, the printed layer, the substrate layer, and the balance layer, for example, may be formed by optically or thermally curing respective compositions including at least one selected from the group consisting of a binder resin, an initiator, a curing agent, other additives, and a combination thereof, or may be formed in a film or sheet shape using an extrusion method, a calendering method, or the like.

In addition, the types and contents of components included in each of the compositions may be appropriately adjusted, without specific limitation, according to the property and function of each layer thereof.

In particular, the flooring material may be formed by applying a predetermined composition to one surface of any one layer thereof, and then optically or thermally curing the same, or may be manufactured by forming respective layers thereof as a film or a sheet, and then laminating the same by a lamination process known in the art, but the present invention is not limited thereto.

In addition, the binder resin may include a synthetic resin, a bioresin, or both, for example, a polyvinyl chloride (PVC) resin, a polyurethane resin, a polylactic acid-based resin, a polyolefin resin, or the like, but the present invention is not limited thereto.

In addition, the transparent layer may have a thickness of about 0.05 mm to about 2.0 mm. When the thickness of the transparent layer is within the range, a design or pattern of a printed layer laminated under the transparent layer, as described below, may be sufficiently protected without an excessive increase in the thickness of the flooring material.

In addition, a pattern of the printed layer may be formed in various ways such as, for example, transfer printing, gravure printing, screen printing, offset printing, rotary printing, and flexographic printing. Further, the printed layer may have a thickness of about 1 μm to about 10 μm, but the present invention is not limited thereto.

In addition, the substrate layer is a base layer of the flooring material and may serve to support a transparent layer and printed layer formed thereon and absorb impact applied from above or below. Such a substrate layer is not specifically limited so long as it is used as a matrix for flooring materials in the art, and may be, for example, a sheet or film including polyvinyl chloride (PVC), a polyolefin, polyester such as polyethylene terephthalate (PET) or glycol-modified polyethylene terephthalate (PETG), or the like. In addition, the substrate layer may have a thickness of about 1.0 mm to about 3.0 mm, but the present invention is not limited thereto.

Further, the balance layer is a part bonded to a bottom surface upon construction and may serve to protect a back surface opposite to a surface of the flooring material and protect against moisture of the bottom. In addition, the balance layer may have a thickness of about 1.0 mm to about 3.0 mm, but the present invention is not limited thereto.

In addition, one or more of the base layer and the balance layer may further include at least one selected from the group consisting of $TiO_2$, $CaCO_3$, wood flour, mica, glass fiber, starch, natural fiber, chaff, rosin, talc, and a combination thereof.

In addition, a dimensionally stable layer may be further included between the printed layer and the base layer. Here, the dimensionally stable layer may have a thickness of about 0.1 mm to about 2.0 mm, but the present invention is not limited thereto.

The dimensionally stable layer may be formed of a composite material including a binder resin and glass fiber impregnated therein and serves to reduce a dimensional strain rate even at high temperature and high humidity. Accordingly, the dimensionally stable layer may maintain high adhesive strength to other layers laminated thereon and thereunder while imparting excellent dimensional stability, thereby realizing excellent durability.

MODE FOR CARRYING OUT THE INVENTION

Hereinafter, the present invention will be described in detail by explaining examples and experimental examples of the invention.

However, these examples and experimental examples are provided for illustrative purposes only and should not be construed as limiting the scope and spirit of the present invention.

Examples 1 to 4 and Comparative Examples 1 to 6

Resin compositions having compositions summarized in Table 1 were prepared. Each of the prepared resin compositions was applied to a polyvinyl chloride (PVC) substrate having a width and length of 10 cm×10 cm, followed by fixing to a light-curing apparatus having a structure shown in FIG. 1. Next, light irradiation was performed stepwise under curing conditions summarized in Table 2 below, thereby manufacturing a cured product specimen formed by curing the resin composition on the substrate. Here, an average thickness of the cured product was 18±2 μm.

TABLE 1

| (Units: g) | Composition 1 | Composition 2 | Composition 3 | Composition 4 | Composition 5 |
|---|---|---|---|---|---|
| Oligomer including silicon-containing functional group | 10 | 10 | — | — | 10 |
| Oligomer including fluorine-containing functional group | 4 | 4 | — | 4 | — |
| Acrylic oligomer I | 20 | 20 | 20 | 20 | 20 |
| Acrylic oligomer II | 20 | 20 | 20 | 20 | 20 |

TABLE 1-continued

| (Units: g) | Composition 1 | Composition 2 | Composition 3 | Composition 4 | Composition 5 |
|---|---|---|---|---|---|
| Monomer I | 15 | 15 | 28 | 15 | 15 |
| Monomer II | 5 | 5 | 10 | 5 | 5 |
| Monomer III | — | — | 10 | 10 | 4 |
| Photoinitiator | 2 | 2 | 2 | 2 | 2 |
| Dispersing agent | 0.5 | 0.5 | 0.5 | 0.5 | 0.5 |
| Leveling agent | 1 | 1 | 1 | 1 | 1 |
| Defoaming agent | 0.5 | 0.5 | 0.5 | 0.5 | 0.5 |
| Antifouling agent | 2 | 2 | 2 | 2 | 2 |
| Quencher | — | — | 6 | — | — |
| Inorganic particles | — | 20 | — | 20 | 20 |
| Composition viscosity (25° C.) | 450 cps | 740 cps | 600 cps | 720 cps | 750 cps |

Oligomer including silicon-containing functional group: silicon urethane acrylate polymer (trade name: Miramer SIU24000, Mw: 40,000 ± 1,000)
Oligomer including fluorine-containing functional group: silicon polyester acrylate (trade name: Miramer LR2000, Mw: 2,500 ± 100)
Acrylic oligomer I: Polyurethane acrylate (weight average molecular weight: 1,100 ± 50)
Acrylic oligomer II: Polyurethane acrylate (weight average molecular weight: 2,400 ± 50)
Monomer I: Hydroxy propyl acrylate
Monomer II: 1,6-hexanediol diacrylate
Monomer III: Trimethylol propane triacrylate
Inorganic particles: Silica nanoparticles (average diameter: 20 ± 5 nm)

TABLE 2

|  |  | Curing condition 1 | Curing condition 2 | Curing condition 3 | Curing condition 4 | Curing condition 5 |
|---|---|---|---|---|---|---|
| First light irradiation | Wavelength range | 172 ± 5 nm | 172 ± 5 nm | — | 172 ± 5 nm | 180 ± 5 nm |
|  | Irradiation amount | 160 mJ/cm$^2$ | 120 mJ/cm$^2$ | — | 120 mJ/cm$^2$ | 120 mJ/cm$^2$ |
|  | Substrate migration rate | 20 ± 1 m/min | 20 ± 1 m/min | — | 20 ± 1 m/min | 20 ± 1 m/min |
|  | Gas condition | N$_2$ condition (O$_2$ 100 ppm) | N$_2$ condition (O$_2$ 100 ppm) | — | N$_2$ condition (O$_2$ 100 ppm) | N$_2$ condition (O$_2$ 100 ppm) |
| Second light irradiation | Wavelength range | 750 nm or higher | 750 nm or higher | 750 nm or higher | — | 750 nm or higher |
|  | Irradiation amount | 80 ± 1 mJ/cm$^2$ | 60 ± 1 mJ/cm$^2$ | 80 mJ/cm$^2$ | — | 80 mJ/cm$^2$ |
|  | Substrate migration rate | 20 ± 1 m/min | 20 ± 1 m/min | 20 ± 1 m/min | — | 20 ± 1 m/min |
|  | Gas condition | Under air condition | Under air condition | Under air condition | — | Under air condition |
| Third light irradiation | Wavelength range | 250-400 nm | 250-400 nm | 250-400 nm | 250-400 nm | — |
|  | Irradiation amount | 600 mJ/cm$^2$ | 800 mJ/cm$^2$ | 600 mJ/cm$^2$ | 600 mJ/cm$^2$ | — |
|  | Substrate migration rate | 20 ± 1 m/min | 20 ± 1 m/min | 20 ± 1 m/min | 20 ± 1 m/min | — |
|  | Gas condition | N$_2$ condition (O$_2$ 200 ppm) | N$_2$ condition (O$_2$ 200 ppm) | N$_2$ condition (O$_2$ 200 ppm) | N$_2$ condition (O$_2$ 200 ppm) | — |
| Fourth light irradiation | Wavelength range | — | 750 nm or higher | — | — | — |
|  | Irradiation amount | — | 60 ± 1 mJ/cm$^2$ | — | — | — |
|  | Substrate migration rate | — | 20 ± 1 m/min | — | — | — |
|  | Gas condition | — | Under air condition | — | — | — |

TABLE 3

|  | Composition type | Curing condition |
|---|---|---|
| Example 1 | Composition 1 | Curing condition 1 |
| Example 2 | Composition 1 | Curing condition 2 |
| Example 3 | Composition 2 | Curing condition 1 |
| Example 4 | Composition 2 | Curing condition 2 |
| Comparative Example 1 | Composition 3 | Curing condition 1 |
| Comparative Example 2 | Composition 4 | Curing condition 1 |
| Comparative Example 3 | Composition 4 | Curing condition 2 |
| Comparative Example 4 | Composition 1 | Curing condition 3 |
| Comparative Example 5 | Composition 1 | Curing condition 4 |
| Comparative Example 6 | Composition 1 | Curing condition 5 |

Experimental Example 1

To observe a surface shape of the cured product according to the present invention, the cured product specimen obtained according to Example 1 was subjected to electron microscope analysis. A result thereof is illustrated in FIG. 2.

Examining FIG. 2, it can be confirmed that a surface of the cured product according to the present invention has a micro-folded shape. In particular, when a surface of the cured product was irradiated with extreme ultraviolet rays of less than 300 nm upon curing of the cured product, such a micro-folded shape was formed on the surface.

Experimental Example 2

To evaluate properties of the cured product according to the present invention, gloss degree, stain resistance, Taber abrasion resistance, and adhesion of the cured products manufactured in Examples 1 to 4 and Comparative Examples 1 to 6 were measured. Particular measurement methods are described below. Measurement results are summarized in Table 4 below:

A) Gloss Degree Evaluation

Measured under a 60° gloss condition using a gloss meter.

B) Stain Resistance Evaluation

A specimen surface was contaminated with oily magic-marker marks, and after 30 seconds, the oily marks were removed with dry cotton fiber. A remaining contamination area, based on the initial contamination area, was observed with the naked eye. Results were classified as follows:

Excellent: When a remaining contamination area is less than 5% based on an initial contamination area Satisfactory: When a remaining contamination area is 5 to 20% based on an initial contamination area Poor: When a remaining contamination area is greater than 20% based on an initial contamination area.

C) Taber Abrasion Resistance Evaluation

The weight of a specimen was measured, and the specimen was subjected to an abrasion resistance test 500 times using an H-18 abradant and Taber abraser (5135 Rotary Platform abraser, manufactured by Erichsen) under a load of 500 g, followed by measuring the weight of the worn specimen so as to compare a weight change in the specimen before and after the test.

D) Adhesion Evaluation

A surface of a specimen was cross-cut by 10 rows horizontally and vertically at 1 mm intervals by means of a knife according to a cross cut test method, thereby obtaining 100 sections. Next, a tape was firmly attached to the cut specimen sections, followed by detaching the tape from the specimen. The number of detached sections among the 100 sections was counted.

TABLE 4

| | Gloss degree | Stain resistance | Taber weight change | Number of detached sections |
|---|---|---|---|---|
| Example 1 | 3 ± 0.5 | excellent | 385 mg | 0 |
| Example 2 | 5 ± 0.5 | excellent | 385 mg | 0 |
| Example 3 | 3 ± 0.5 | excellent | 310 mg | 0 |
| Example 4 | 5 ± 0.5 | excellent | 310 mg | 0 |
| Comparative Example 1 | 7 ± 0.5 | poor | 426 mg | 0 |
| Comparative Example 2 | 3 ± 0.5 | poor | 350 mg | 0 |
| Comparative Example 3 | 5 ± 0.5 | poor | 350 mg | 0 |
| Comparative Example 4 | 36 ± 0.5 | excellent | 340 mg | 0 |
| Comparative Example 5 | 5 ± 0.5 | excellent | 480 mg | 0 |
| Comparative Example 6 | 5 ± 0.5 | excellent | 530 mg | 0 |

As shown in Table 4, it can be confirmed that the cured product according to the present invention cured by sequentially irradiating light in different specific wavelength ranges exhibits low gloss, and even if a resin composition thereof excludes a matting agent, excellent stain resistance and abrasion resistance.

In particular, the cured product specimen of Examples 1 to 4 exhibited a gloss degree of 1 to 6 under a 60° gloss condition, without use of a matting agent, and high stain resistance against oily magic-marker marks. In addition, the cured products exhibited a weight change rate of 400 mg or less, particularly a weight change rate of about 300 to 390 mg when subjected to Taber abrasion resistance evaluation due to increased abrasion resistance, and no section was detached from the cured products when subjected to cross-cut evaluation.

On the other hand, it was confirmed that the cured product specimens of Comparative Examples 1 to 3 including a matting agent exhibited a gloss degree of 8 or less at a 60° gloss condition, but exhibited low stain resistance against oily magic-marker marks. In addition, the cured product specimen of Comparative Example 4 was not subjected to a step of irradiating with extreme ultraviolet rays having high energy, thereby exhibiting a remarkably high gloss degree under a 60° gloss condition. Further, when the cured product specimen of Comparative Examples 5 and 6 were subjected to Taber abrasion resistance evaluation, weight change rates therein were about 450 mg or more.

From these results, it can be confirmed that the cured product includes an oligomer having a functional group containing silicon (Si) and/or fluorine (F) along with an acrylic oligomer, and thus, exhibits excellent stain resistance and is capable of realizing a micro-folded structure on a surface thereof due to extreme ultraviolet rays used for curing, thereby being capable of realizing low gloss without a matting agent.

DESCRIPTION OF SYMBOLS

100: Light-curing apparatus
110: Light irradiation room
111: First light irradiator (UV irradiator)
112: Second light irradiator (IR irradiator)
113: Third light irradiator (UV irradiator)
120: Irradiated light
130: Conveyor belt
140: Gas diaphragm
150: Specimen

INDUSTRIAL APPLICABILITY

A cured product according to the present invention includes, along with an acrylic oligomer, an oligomer having a functional group containing silicon (Si) and an oligomer having a functional group containing fluorine (F), and thus, exhibits excellent stain resistance and is capable of realizing a micro-folded structure on a surface thereof due to extreme ultraviolet rays used for curing, thereby being capable of realizing low gloss without a matting agent.

The invention claimed is:

1. A method of manufacturing a cured product, the method comprising:
    a first light irradiation step of irradiating a resin composition comprising an oligomer comprising a silicon (Si)-containing functional group; an oligomer comprising a fluorine (F)-containing functional group; and an acrylic oligomer with light having a wavelength of 300 nm or less to activate a resin composition;
    a second light irradiation step of irradiating the activated resin composition with light having a wavelength of 700 nm or higher to thermally cure the resin composition; and a third light irradiation step of irradiating the thermally cured resin composition with light having a wavelength of 400 nm or less to optically cure the resin composition.

2. The method according to claim 1, wherein the first and third light irradiation steps are performed under an inert gas condition where the concentration of oxygen ($O_2$) is 10 ppm to 10,000 ppm.

3. The method according to claim 1, wherein, in the second light irradiation step, a surface temperature of the resin composition is 20 to 90° C.

4. The method according to claim 1, wherein the resin composition has a viscosity of 100 cps to 1,000 cps at 25±1° C.

5. The method according to claim 1, further comprising, after the third light irradiation step, a fourth light irradiation step of irradiating the optically cured resin composition with light having a wavelength of 700 nm or higher to thermally cure the resin composition.

* * * * *